United States Patent [19]

Langenfeld et al.

[11] 4,266,909
[45] May 12, 1981

[54] MEANS FOR HYDRAULIC SELF-LEVELING OF A LOADER BUCKET

[75] Inventors: Joseph W. Langenfeld, Onawa; Neal W. Westendorf, Smithland, both of Iowa

[73] Assignee: Westendorf Manufacturing Co., Onawa, Iowa

[21] Appl. No.: 7,476

[22] Filed: Jan. 29, 1979

[51] Int. Cl.³ .............................................. B66F 9/22
[52] U.S. Cl. .................................... 414/700; 91/422; 414/708
[58] Field of Search ............... 414/699, 700, 706, 708, 414/712, 728, 686; 91/222, 422

[56] References Cited

U.S. PATENT DOCUMENTS

| | | | |
|---|---|---|---|
| 2,462,580 | 2/1949 | Watson | 91/422 X |
| 3,082,746 | 3/1963 | Kerridge | 91/422 X |
| 3,593,616 | 7/1971 | Fox | 91/422 X |
| 3,695,474 | 10/1972 | Blakely | 414/700 X |
| 3,843,004 | 10/1974 | Kambe | 414/700 |
| 3,862,697 | 1/1975 | Gill et al. | 414/700 |

*Primary Examiner*—Leslie J. Paperner
*Assistant Examiner*—Terrance L. Siemens
*Attorney, Agent, or Firm*—Zarley, McKee, Thomte, Voorhees & Sease

[57] ABSTRACT

An apparatus for hydraulic self-leveling of a loader bucket or the like is described wherein the loader upon which the bucket is mounted comprises a pair of spaced-apart boom arms pivotally mounted on a subframe attached to the tractor. The loader bucket is pivotally connected to the forward ends of the boom arms and may be pivotally moved from a level position to an extreme dump position or an extreme roll-back position by means of hydraulic cylinders extending between the loader bucket and the boom arms. A first leveling cylinder is connected to one of the boom arms and one of the sub-frame towers so that upward movement of the boom arms causes the cylinder rod of the actuator cylinder to be extended therefrom and so that downward movement of the boom arms causes the cylinder rod of the actuator cylinder to be moved inwardly into the cylinder. Extension of the cylinder rod from the actuator cylinder forces fluid from the actuator cylinder to be supplied to the extension side of the bucket cylinders so that the bucket is maintained in a level position as the boom arms are being raised. Conversely, retraction of the cylinder rod into the actuator cylinder as the boom arms are being pivotally moved downwardly causes hydraulic fluid from the actuator cylinder to be supplied to the retraction side of the bucket cylinders to maintain the bucket in a level position as the boom arms are being lowered.

3 Claims, 8 Drawing Figures

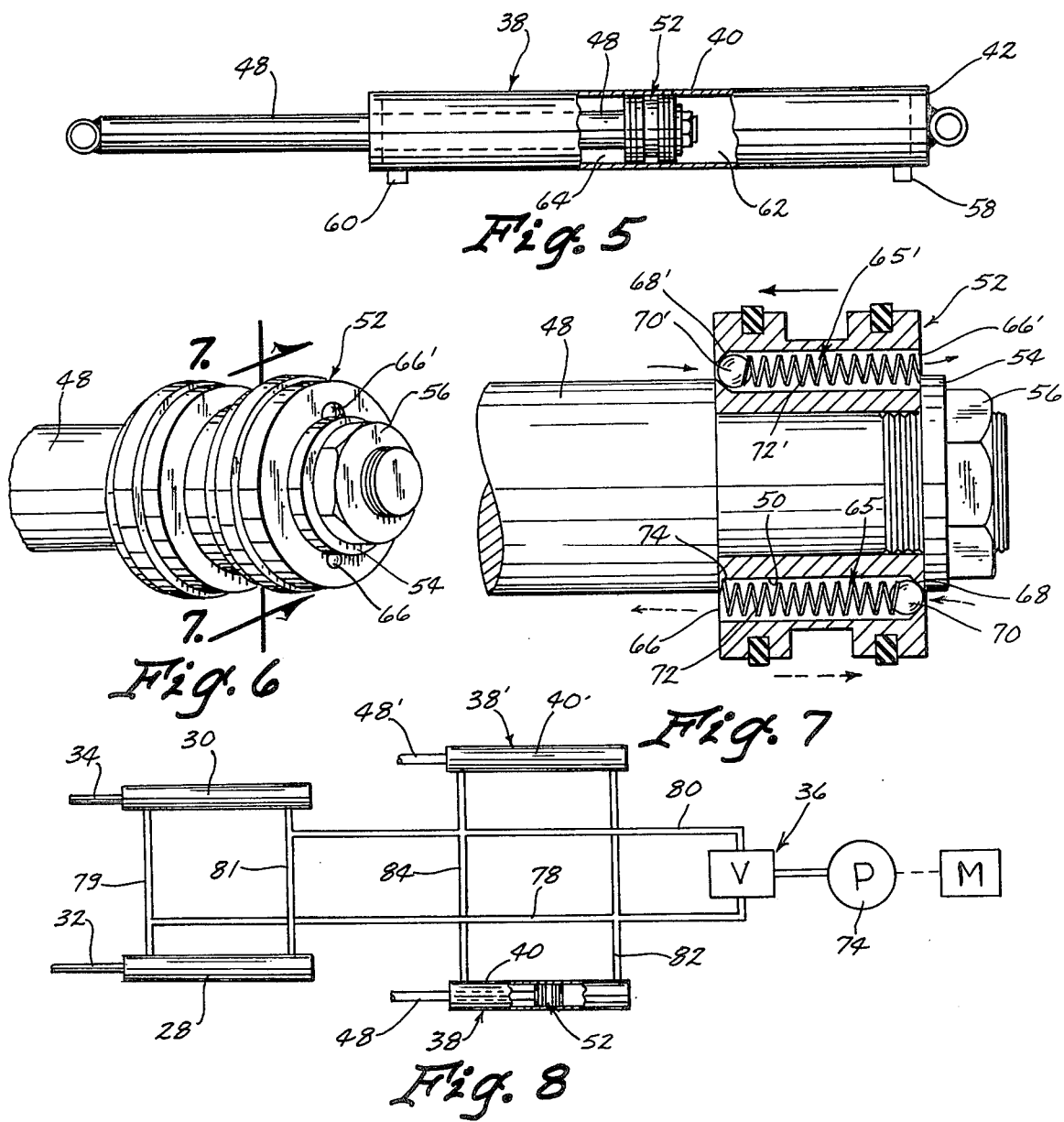

MEANS FOR HYDRAULIC SELF-LEVELING OF A LOADER BUCKET

BACKGROUND OF THE INVENTION

This invention relates to a means for hydraulic self-leveling of a loader bucket and more particularly to a simplified means for maintaining a loader bucket in a level condition as the bucket is being raised or lowered by the tractor loader. Tractor loaders are in widespread use and generally comprise a pair of boom arms which are pivotally secured to a frame means mounted on the tractor. Many types of materials handling implements may be mounted on the boom arms with a common implement being a conventional loader bucket. The loader bucket is normally pivotally mounted on the forward ends of the boom arms and is pivotally movable with respect thereto by means of hydraulic cylinders. Ordinarily, upward movement of the boom arms causes the loader bucket to be rolled back or tipped back even though the bucket cylinders are not being actuated. Conversely, downward movement of the boom arms causes the loader bucket to tip forwardly towards a dumping position. In many operations, it is highly desirable to maintain the loader bucket in a level position while either raising or lowering the boom arms so that the material therein does not either fall rearwardly from the bucket as the bucket is being raised or fall from the forward end of the bucket as the bucket is being lowered.

Mechanical linkages have been provided for leveling the bucket during the movement of the boom arms but the mechanical linkages are quite costly, difficult to maintain, and add an objectionable large amount of weight to the overall assembly.

Therefore, it is a principal object of the invention to provide an improved and simplified means for automatic self-leveling of a loader bucket.

A atill further object of the invention is to provide a means for the hydraulic self-leveling of a loader bucket while the bucket is being raised or lowered.

A further object of the invention is to provide a means which automatically maintains the loader bucket in a level position while the boom arms are being raised or lowered without adding objectionable weight to the loader.

A further object of the invention is to provide a means for the hydraulic self-leveling of a loader bucket which may be mounted on existing loader devices.

A further object of the invention is to provide a means for hydraulic self-leveling of a loader bucket including a pressure relief valve means to prevent objectionable pressure build-up in the actuator cylinder.

A still further object of the invention is to provide a hydraulic cylinder having pressure relief valve means provided in the piston thereof to permit fluid flow from one cylinder compartment to the other upon a predetermined amount of fluid pressure being experienced in that compartment.

These and other objects will be apparent to those skilled in the art.

BRIEF DESCRIPTION OF THE DRAWINGS

FIG. 5 is a side view of the actuator cylinder with portions thereof cut away to more fully illustrate the invention:

FIG. 6 is a perspective view of the actuator cylinder piston:

FIG. 7 is an enlarged sectional view seen on lines 7—7 of FIG. 6; and

FIG. 8 is a schematic view of the circuitry of this invention.

SUMMARY OF THE INVENTION

Figure 1:
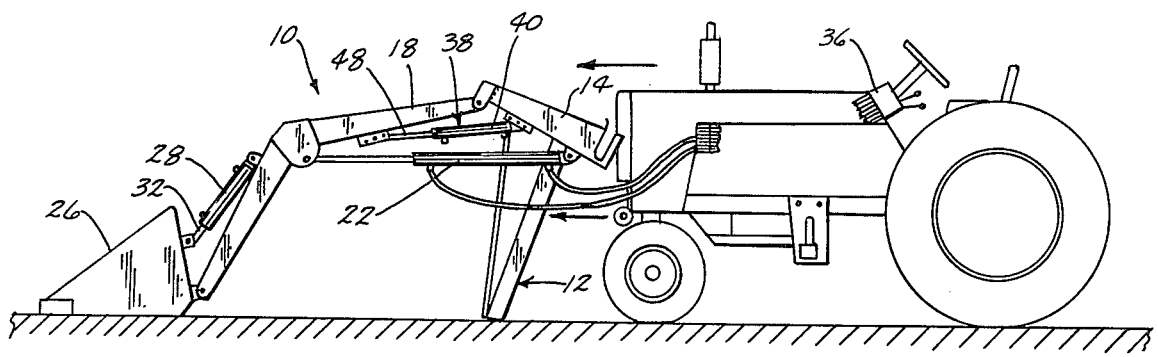
FIG. 1 is a side view of a tractor loader having the means of this invention mounted thereon.
Figure 2:
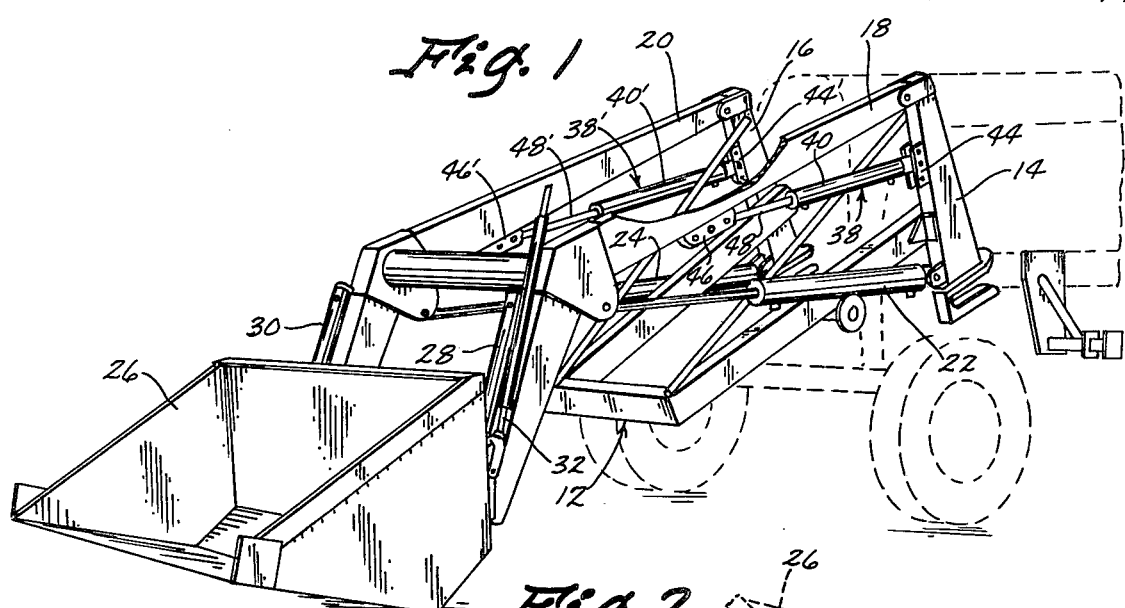
FIG. 2 is a front perspective view of a typical tractor loader having the actuator cylinder of this invention mounted thereon with the loader being illustrated in a partially mounted position.

A means for hydraulic self-leveling of a loader bucket is disclosed herein which is accomplished by means of actuator cylinders mounted on the loader device so that pivotal movement of the boom arms causes movement of the cylinder rods of the actuator cylinders. The extension and retraction compartments of the actuator cylinders are fluidly connected to the bucket cylinders so that hydraulic fluid is supplied to the bucket cylinders during the pivotal movement of the boom arms so that the bucket is maintained in a level position as the boom arms are raised or lowered. The actuator cylinders are provided with a pressure relief valve means mounted in the piston thereof to permit hydraulic fluid to flow from one cylinder compartment to the other upon a predetermined fluid pressure being experienced in that particular compartment.

DESCRIPTION OF THE PREFERRED EMBODIMENT

The numeral 10 refers generally to a loader attachment such as the All-Matic WL-42 manufactured by Westendorf Manufacturing Company of Onawa, Iowa. Generally speaking, the loader 10 comprises a sub-frame 12 which is detachably mounted on the tractor. A pair of upstanding posts or towers 14 and 16 are secured to the rearward end of the sub-frame 12 and extend upwardly therefrom. Boom arms 18 and 20 are pivotally secured to the upper ends of the towers 14 and 16 and extend forwardly therefrom. Hydraulic cylinders 22 and 24 are pivotally secured to the towers and the boom arms 18 and 20 for pivotally raising the boom arms relative to the tractor.

Figure 4:
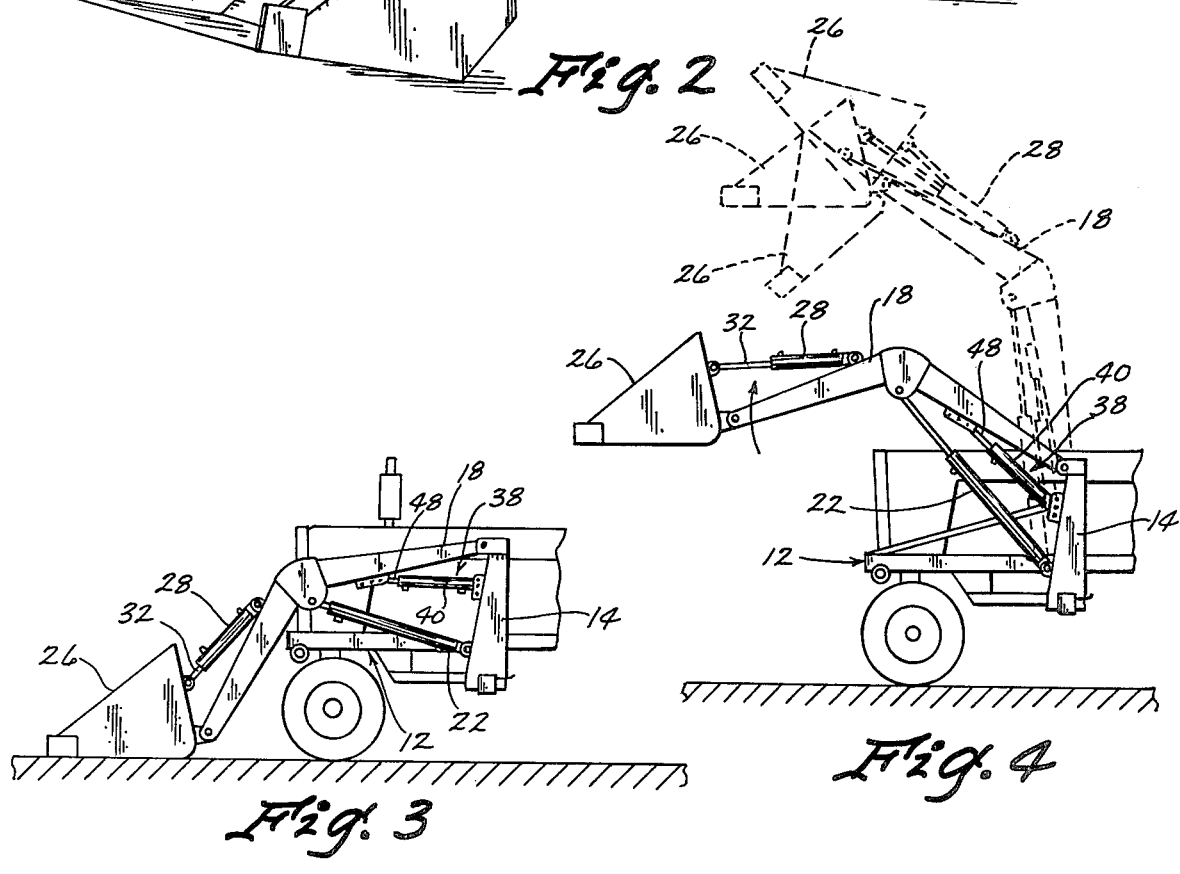
FIG. 4 is a side view similar to FIG. 3 except that the loader bucket has been raised from the position of FIG. 3 with the broken lines illustrating further upward movement of the bucket.

The numeral 26 refers to a materials handling implement which is pivotally mounted on the forward ends of the boom arms 18 and 20. The invention described herein is ideally suited for use with a bucket such as that illustrated in the drawings. The bucket 26 is movable from a level position illustrated in FIG. 4 to the fully dumped position illustrated by broken lines in FIG. 4 or to the tipped-back position also illustrated in FIG. 4. A pair of hydraulic cylinders 28 and 30 are pivotally connected to the boom arms 18 and 20 respectively and are pivotally connected to the rearward side of the bucket 26 so that extension of the cylinder rods 32 and 34 of the cylinders 28 and 30 causes the bucket 26 to be moved to its dumped position. Conversely, retraction of the cylinder rods 32 and 34 causes the bucket 26 to be moved towards the tipped-back position. The hydraulic cylinders 22, 24, 28 and 30 are operatively connected to the tractor hydraulic system including a suitable valve means generally depicted by the reference numeral 36 in the schematic view of FIG. 8.

The numeral 38 refers to the hydraulic actuator cylinder which is mounted on the loader device. The precise location of hydraulic cylinder 38 on the loader may vary somewhat although the preferred location is that which is shown in the drawings. Cylinder 38 includes a body 40 having a base end 42 which is pivotally secured to tower 14. Preferably, base 42 is secured to plate 44 which is mounted on the tower 14 and which has a plurality of openings formed therein to permit the hydraulic cylinder 38 to be secured to the tower 14 in different positions so as to accommodate different types of loaders. Likewise, a plate 46 is secured to boom arm 18 and has a plurality of holes or openings formed therein adapted to receive the rod 48 of hydraulic cylinder 38. In other words, if the apparatus of this invention is not factory installed, plates 44 and 46 would be provided with the actuator cylinder 38 so that the actuator cylinder 38 may be mounted on different types of loaders. If the apparatus of this invention is factory installed, the plates 44 and 46 may be eliminated since the factory will know the precise location for mounting the hydraulic cylinder 38 on the tower and boom arm.

Rod 48 includes a reduced diameter portion 50 at its inner end which receives the piston 52. Piston 52 is maintained on the rod 48 by means of washer 54 and nut 56. Cylinder body 40 is provided with ports 58 and 60 adjacent its opposite ends which communicate with the compartments 62 and 64 defined by the piston 52 in actuator cylinder 38.

Piston 52 is provided with an elongated bore 66 formed therein as best illustrated in the drawings and which includes a valve seat 68 at one end thereof. The numeral 70 refers to a ball valve which is positioned in bore 68 and which is adapted to seat upon valve seat 68. Compression spring 72 is mounted in bore 66 and yieldably urges ball valve 70 into seating engagement with the valve seat 68. As seen in the drawings, the bore 66 is formed in the piston 52 in such a manner so that one end of the bore 66 is partially covered by the annular shoulder 74 so that spring 72 is maintained within bore 66. For the purposes of conciseness of description, elements 66, 68, 70 and 72 comprise a pressure relief valve 65.

A pressure relief valve 65' is also provided in the piston 52 and comprises an elongated bore 66' having a valve seat 68' at one end thereof. Ball valve 70' is adapted to seat upon valve seat 68' and is urged into seating engagement by the compression spring 72'. Bore 66' is drilled in piston 52 in such a manner so that the washer 50 partially covers one end of the bore to maintain the compression spring 72' therein. Thus, check valve 65 will permit fluid communication from compartment 62 into compartment 64 upon a predetermined pressure being achieved in compartment 62. Conversely, check valve 65' will permit fluid communication from compartment 64 to compartment 62 upon a predetermined pressure being reached in compartment 64.

The numeral 38' refers to a hydraulic actuator cylinder mounted on boom arm 20 and tower 16 which is identical to cylinder 38. The preferred embodiment of the invention is to employ the cylinders 38 and 38' although a single cylinder may be utilized if desired.

Referring to the schematic view of FIG. 8, the numeral 74 refers to the hydraulic pump on the tractor which is conventionally connected to the valve 36. Valve 36 is connected to the retraction side of the cylinders 28 and 30 by hydraulic lines 78 and 79 and is connected to the extension side of the hydraulic cylinders 28 and 30 by the lines 80 and 81. Port 58 of cylinder 38 is connected to line 78 by line 82 with port 60 being connected to line 80 by line 84. Cylinder 38' is connected to lines 78 and 80 as indicated.

Figure 3:
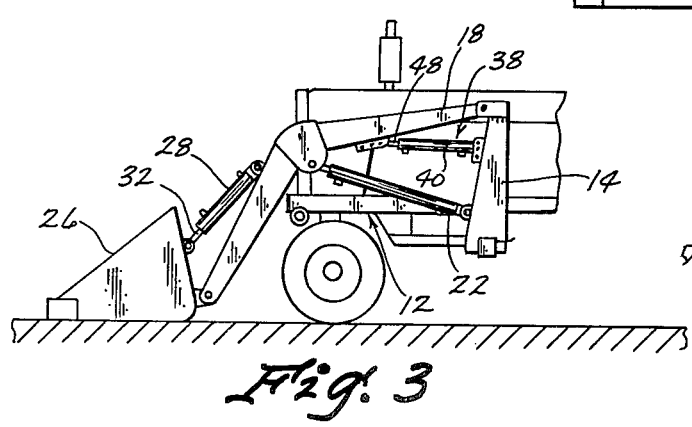
FIG. 3 is a side view of the invention mounted on the tractor loader with the loader bucket being in a lowered position.

Inasmuch as the cylinders 38 and 38' function identically, only the operation of cylinder 38 will be described in detail. Assuming that the bucket 26 is in the level position with the boom arms 18 and 20 in the lowered position of FIG. 3, extension of the cylinders 22 and 24 causes the boom arms 18 and 20 to be pivotally moved upwardly which causes the extension of rod 48 from body 40 of cylinder 38. Extension of rod 48 causes the oil in compartment 64 to be compressed and forced outwardly from port 60 through line 84 and into lines 80 and 81 so that additional hydraulic fluid is supplied to the extension side of the cylinders 28 and 30 so that the rods thereof are extended as the boom arms 18 and 20 are pivotally moved upwardly. Extension of the rods from cylinders 28 and 30 causes the bucket to be pivoted relative to the boom arms 18 and 20 during the pivotal movement thereof which keeps the bucket in the level position. Conversely, when the boom arms 18 and 20 are moved from an upper position to a lower position, with the bucket in a level position, the rod 48 of cylinder 38 is moved inwardly into the body 40 so that the hydraulic fluid in compartment 62 is forced outwardly through port 58, lines 82, 78 and 79 and into the retraction side of the cylinders 28 and 30 to retract the cylinder rods in the cylinders 28 and 30 which causes the bucket to be pivotally moved in a clockwise direction, as viewed in FIG. 4, as the boom arms are being lowered so that the bucket remains in its level position.

The pressure relief valves 65 and 65' are very important in applicants' invention. If the bucket is in the extreme dump position when it is desired to raise the boom arms 18 and 20, the actuator cylinder 38 would tend to force additional oil into the extension sides of the cylinders 28 and 30 which is not possible since the rods of cylinders 28 and 30 are in their fully extended position and such position would create an undesirable pressure build-up in compartment 64. When the pressure reaches a predetermined level in compartment 64, ball valve 70' unseats from seat 68' and permits the fluid in compartment 64 to flow into compartment 62. Conversely, if the loader bucket is in the extreme roll-back or tipped-back position and it is desired to lower the boom arms, the actuator cylinder 38 would tend to force additional oil into the retraction side of the cylinders 28 and 30 which is not possible since the rods of cylinders 28 and 30 are in their fully retracted position and such position would create an objectionable pressure build-up in compartment 62. When the pressure reaches a predetermined level in compartment 62, ball valve 70 unseats from valve seat 68 to permit the fluid in compartment 62 to flow into compartment 64.

Thus it can be seen that a novel apparatus has been provided for hydraulic self-leveling of a loader bucket. The apparatus of this invention is quite simple in operation and does not add an objectionable amount of weight to the apparatus and does away with complicated linkages normally found in such devices.

Although the pressure relief means described in the piston is ideally suited for use with the actuator cylinder of this invention, it should be understood that the pressure relief means does have application in other environments. It should also be noted that the means for maintaining the springs in the bores 66 and 66' as well as the ball valves enables the piston to be economically fabricated and assembled.

Thus it can be seen that the means of this invention accomplishes at least all of its stated objectives.

We claim:

1. In combination,
    a tractor,
    a front-end loader apparatus mounted on said tractor including a pivotal boom means movable between raised and lowered positions and having a materials handling member pivotally mounted at the forward end thereof, said materials handling member adapted to support material therein and being movable from a level positon to either a dump position or a tipped-back position, said loader apparatus including a first hydraulic cylinder means for pivotally moving said boom means with respect to said tractor to raise and lower said materials handling member, said loader apparatus also including a second hydraulic cylinder means for pivotally moving said materials handling member between its dump and tipped-back positions,
    and a third hydraulic cylinder means operatively connected to said boom means so that pivotal movement of said boom means causes the cylinder rod thereof to be retracted or extended depending upon the movement of said boom means,
    said third hydraulic cylinder means fluidly connected to said second hydraulic cylinder means so that retraction or extension of said third hydraulic cylinder means, as said boom means pivotally moves, causes predetermined retraction or extension of said second hydraulic cylinder to maintain said materials handling member in its level position,
    said second hydraulic cylinder means being fluidly connected to said third hydraulic cylinder means so that said boom means may be moved from its upper position to its lower position when said materials handling member is in its tipped-back position and so that said boom means may be moved from its lower position to its upper position when said materials handling member is in its dump position.

2. The combination of claim 1 wherein said third hydraulic cylinder means comprises a cylinder body, a piston slidably mounted in said body to define first and second compartments, the cylinder rod being connected to said piston and extending outwardly from the cylinder body, and a pressure relief valve means in said piston for permitting fluid communication between said first and second compartments when a predetermined pressure is experienced in one of said compartments.

3. The combination of claim 1 wherein said third hydraulic cylinder means comprises a pair of hydraulic cylinders.

* * * * *